United States Patent
Miyazawa et al.

(10) Patent No.: US 9,753,637 B2
(45) Date of Patent: Sep. 5, 2017

(54) INFORMATION PROCESSING APPARATUS, INFORMATION PROCESSING METHOD, AND PROGRAM

(75) Inventors: Yusuke Miyazawa, Tokyo (JP);
Fuminori Homma, Tokyo (JP);
Junichiro Sakata, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 934 days.

(21) Appl. No.: 12/971,347

(22) Filed: Dec. 17, 2010

(65) Prior Publication Data
US 2011/0157006 A1   Jun. 30, 2011

(51) Int. Cl.
*G06F 3/041* (2006.01)
*G06F 3/0488* (2013.01)

(52) U.S. Cl.
CPC .. *G06F 3/0488* (2013.01); *G06F 2203/04108* (2013.01)

(58) Field of Classification Search
CPC . G09G 3/32; G09G 3/20; H01L 27/32; H01L 51/52; G06F 3/045; G06F 3/041
USPC ............ 345/156, 157, 169, 173, 174; 178/18.01–18.03
See application file for complete search history.

(56) References Cited

U.S. PATENT DOCUMENTS

| | | | |
|---|---|---|---|
| 2002/0196238 A1* | 12/2002 | Tsukada et al. | 345/173 |
| 2005/0200611 A1* | 9/2005 | Goto et al. | 345/173 |
| 2009/0244023 A1* | 10/2009 | Kim et al. | 345/173 |
| 2009/0289914 A1* | 11/2009 | Cho | 345/173 |

FOREIGN PATENT DOCUMENTS

JP   2008-287323   11/2008

* cited by examiner

*Primary Examiner* — Pegeman Karimi
(74) *Attorney, Agent, or Firm* — Paratus Law Group, PLLC (57) ABSTRACT

An information processing apparatus includes a detection section configured to detect an operating body in proximity to a display screen, an identification section configured to identify whether the operating body detected by the detection section is in proximity to a selection item included in the display screen, and a display control section configured to temporarily superimpose and display a region including selection item content of the selection item over a previously displayed display region when the identification section identifies the operating body as being in proximity to the selection item and configured to end a display of the region including the selection item content of the selection item when the detection section no longer detects the operating body as being in proximity to the display screen.

12 Claims, 10 Drawing Sheets

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program, and particularly relates to an information processing apparatus, an information processing method, and a program whereby proximity of an operating body to a display screen is detected to control a display of the display screen.

2. Description of the Related Art

One type of a display device is a touchscreen (touch panel) in which a capacitive or resistive touch sensor is provided to the surface of a display section such as a liquid crystal display. With a touchscreen, input to an information processing apparatus is possible by touching a display screen. Thus, a user can handle the information processing apparatus easily.

When an operation is performed using a touch panel, it is desirable for a displayed icon, button, or the like to be constant in size in order for a display item to be selected through contact on a display screen. Thus, in an on-screen keyboard or the like of a touch panel, it is desirable to increases the size of a key as much as possible. However, since the area of a display screen is limited in a mobile device, there has been a problem that increasing the size of a key prevents information other than the key from being displayed.

Thus, a technique of temporarily enlarging display content in a selected region is disclosed (for example, Japanese Unexamined Patent Application Publication No. 2008-287323). In Japanese Unexamined Patent Application Publication No. 2008-287323, the operability is improved by enlarging a display of a key in the selected region.

SUMMARY OF THE INVENTION

However, there has been a problem that the utilization efficiency of a screen decreases when displayed display content is enlarged since a surrounding element is hidden by an enlarged display.

Thus, it is desirable to provide a novel and improved information processing apparatus, information processing method, and program that are capable of improving the utilization efficiency of a screen while improving the operability of a touch panel.

According to an embodiment of the present invention, there is provided an information processing apparatus including a detection section configured to detect an operating body in proximity to a display screen, an identification section configured to identify whether the operating body detected by the detection section is in proximity to a selection item included in the display screen, and a display control section configured to temporarily superimpose and display a region including selection item content of the selection item over a previously displayed display region when the identification section identifies the operating body as being in proximity to the selection item and configured to end a display of the region including the selection item content of the selection item when the detection section no longer detects the operating body as being in proximity to the display screen.

The information processing apparatus may further include a specification section configured to specify a range of the display screen where the operating body detected by the detection section is in proximity. The identification section may identify whether the range specified by the specification section includes the selection item.

The display control section may end the display of the region including the selection item content of the previously displayed selection item when the detection section detects the operating body as being in contact with the display screen.

The display control section may display a region including an enlarged display of the selection item content of the selection item when the identification section identifies the operating body as being in proximity to the selection item.

The display control section may display a region including a pull-down display of the selection item content of the selection item when the identification section identifies the operating body as being in proximity to the selection item.

The display control section may display a region including conversion content of the selection item when the identification section identifies the operating body as being in proximity to the selection item.

The display control section may display a region including content of a parent or child of the selection item when the identification section identifies the operating body as being in proximity to the selection item.

According to another embodiment of the present invention, there is provided an information processing method including the steps of detecting an operating body in proximity to a display screen, identifying whether the detected operating body is in proximity to a selection item included in the display screen, and superimposing and displaying selection item content of the selection item over the previously displayed display screen when the operating body is identified as being in proximity to the selection item.

According to still another embodiment of the present invention, there is provided a program which causes a computer to function as an information processing apparatus including a detection section configured to detect an operating body in proximity to a display screen, an identification section configured to identify whether the operating body detected by the detection section is in proximity to a selection item included in the display screen, and a display control section configured to superimpose and display selection item content of the selection item over the previously displayed display screen when the identification section identifies the operating body as being in proximity to the selection item.

According to the embodiments of the present invention described above, the utilization efficiency of a screen can be improved while improving the operability of a touch panel.

DESCRIPTION OF THE PREFERRED EMBODIMENTS

A preferred embodiment of the present invention will be described below in detail with reference to the accompanying drawings. Note that, in this specification and the drawings, components having substantially the same functional configuration are denoted by the same reference numeral to omit redundant description.

The preferred embodiment of the present invention will be described in the following order.
[1] Purpose of this embodiment
[2] Hardware configuration of information processing apparatus
[3] Functional configuration of information processing apparatus
[4] Operation of information processing apparatus in detail
[1] Purpose of this Embodiment First, the purpose of this embodiment is described. One type of a display device is a touchscreen (touch panel) in which a capacitive or resistive touch sensor is provided to the surface of a display section such as a liquid crystal display. With a touchscreen, input to an information processing apparatus is possible by touching a display screen. Thus, a user can handle the information processing apparatus easily.

When an operation is performed using a touch panel, it is desirable for a displayed icon, button, or the like to be constant in size in order for a display item to be selected through contact on a display screen. Thus, in an on-screen keyboard or the like of a touch panel, it is desirable to increases the size of a key as much as possible. However, since the area of a display screen is limited in a mobile device, there has been a problem that increasing the size of a key prevents information other than the key from being displayed.

Figure 9:
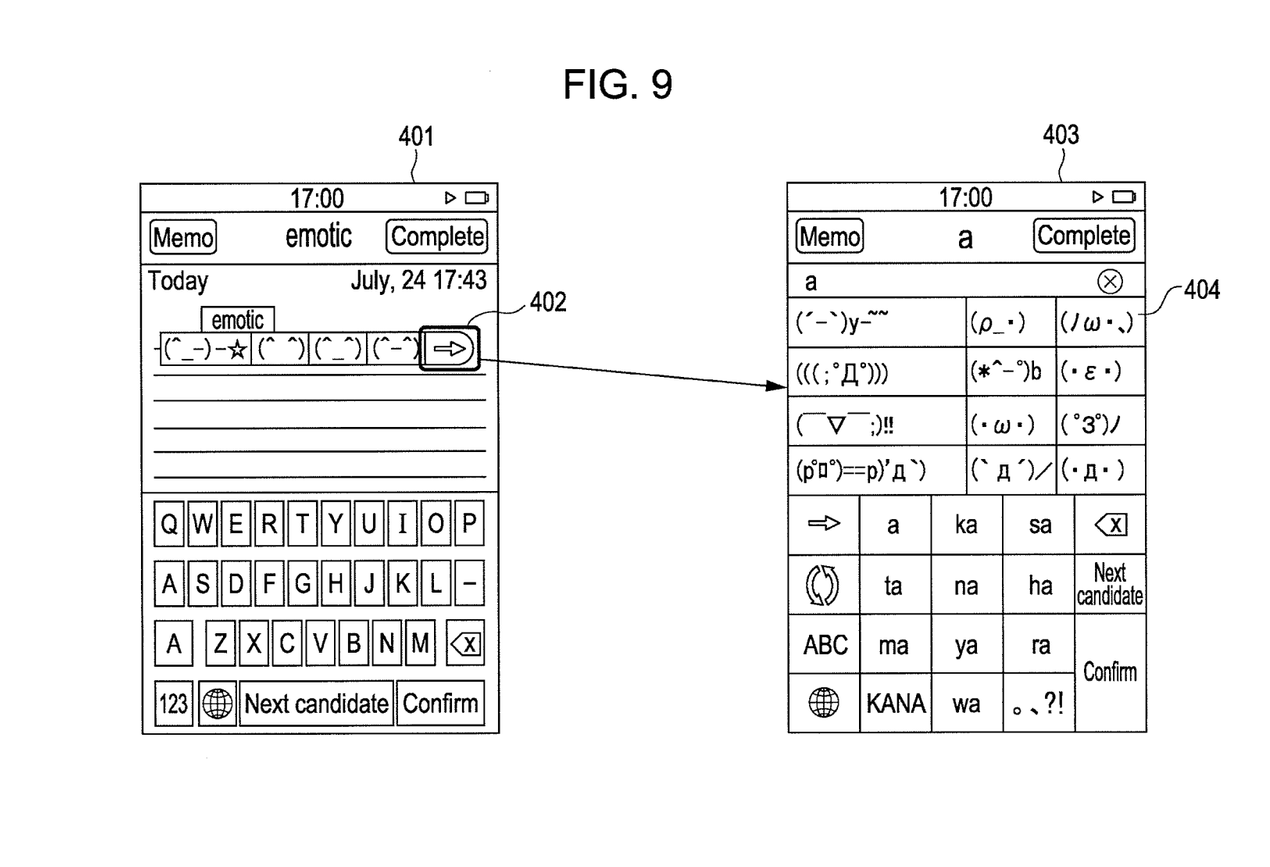
FIG. 9 illustrates a display example of a related art.

Thus, for an effective utilization of a display region of a display screen, a technique is disclosed in which a region of a conversion candidate for input content is enlarged. As shown in FIG. 9, the display screen 401 includes a GUI button 402 for enlarging the display region and displaying another display screen 403. In the technique, there has been a problem of an increase in operation steps since the region of the conversion candidate is enlarged and the another display screen 403 is displayed mainly by pressing the dedicated GUI button in order to search or select the conversion candidate 404.

Figure 10:
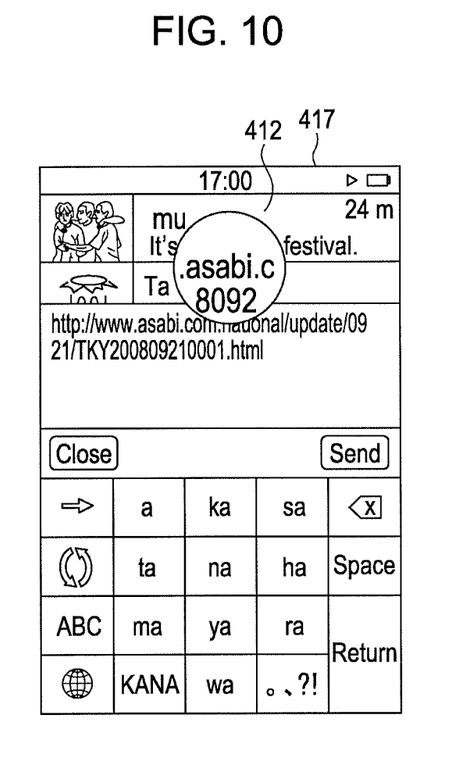
FIG. 10 illustrates a display example of a related art.

Also, a technique is devised in which display content of a selected region is enlarged temporarily in order to improve the operability of key input or the like or the visibility of the display content. For example, the operability is improved by enlarging a display of a key or the like in the selected region, or the visibility is improved by enlarging 412 the selected display content that is displayed on a display screen 417, as shown in FIG. 10. However, there has been a problem that the utilization efficiency of a screen decreases when the displayed display content is enlarged since a surrounding element is hidden by an enlarged display.

Figure 1:
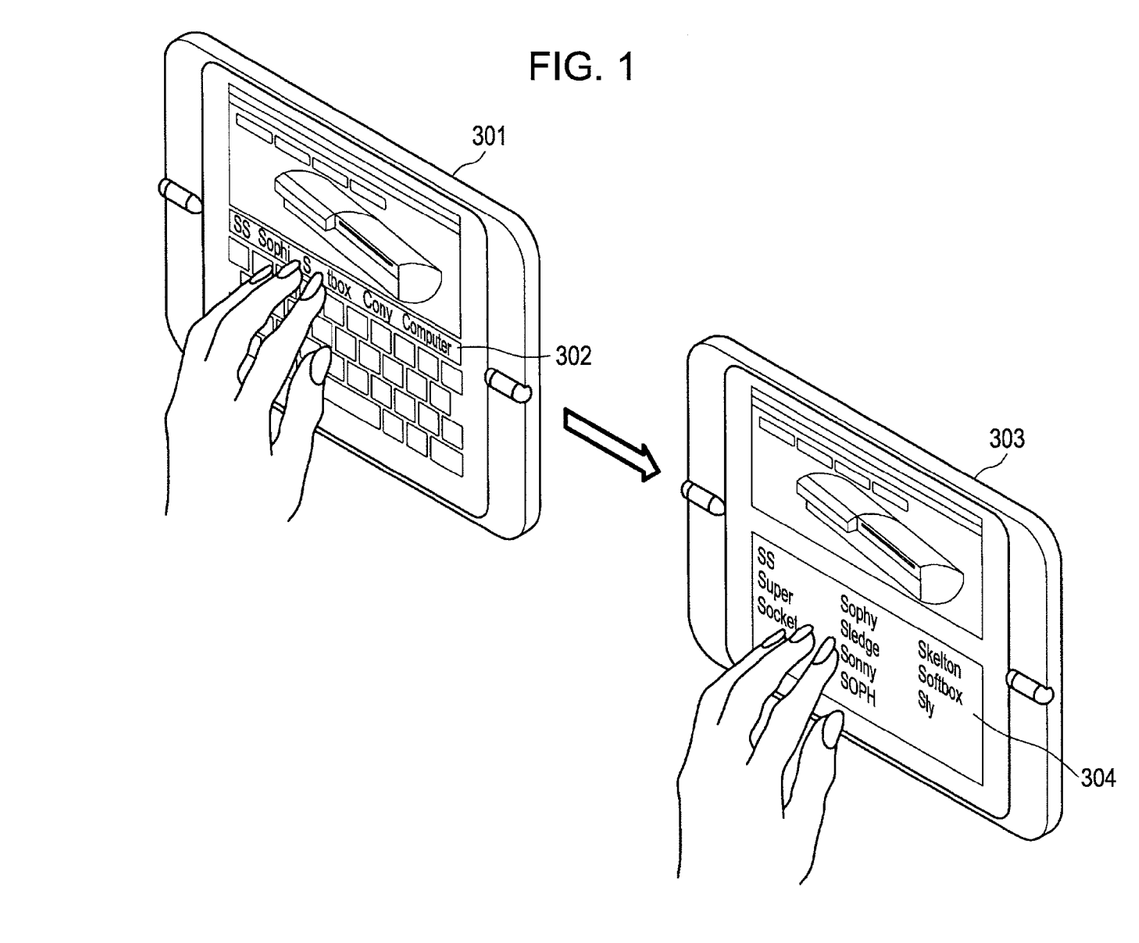
FIG. 1 illustrates a display example according to an embodiment of the present invention.

Thus, in consideration of the above circumstance, an information processing apparatus 100 according to the embodiment of the present invention has been created. With the information processing apparatus 100 of this embodiment, it is possible to improve the utilization efficiency of a screen while improving the operability of a touch panel. For example, as shown in FIG. 1, selection items displayed in a display example 302 are temporarily displayed over a display of keys displayed in a display example 301. That is, a display region including display content different from display content displayed in a display screen is temporarily shown according to user operation. In this manner, it is possible to improve the utilization efficiency of a screen while improving the operability of a touch panel by temporarily enlarging a display region.

Although a small audio player or media player, a personal digital assistant (PDA), or a mobile phone as shown in FIG. 1 is described as an example in this embodiment, the information processing apparatus 100 is not limited to the example and may be applied to a personal computer or the like. Also, although configured as an integrated apparatus including a display device such as a display, the information processing apparatus 100 is not limited to the example and may be configured as an apparatus separate from the display device.

[2] Hardware Configuration of Information Processing Apparatus

Figure 2:
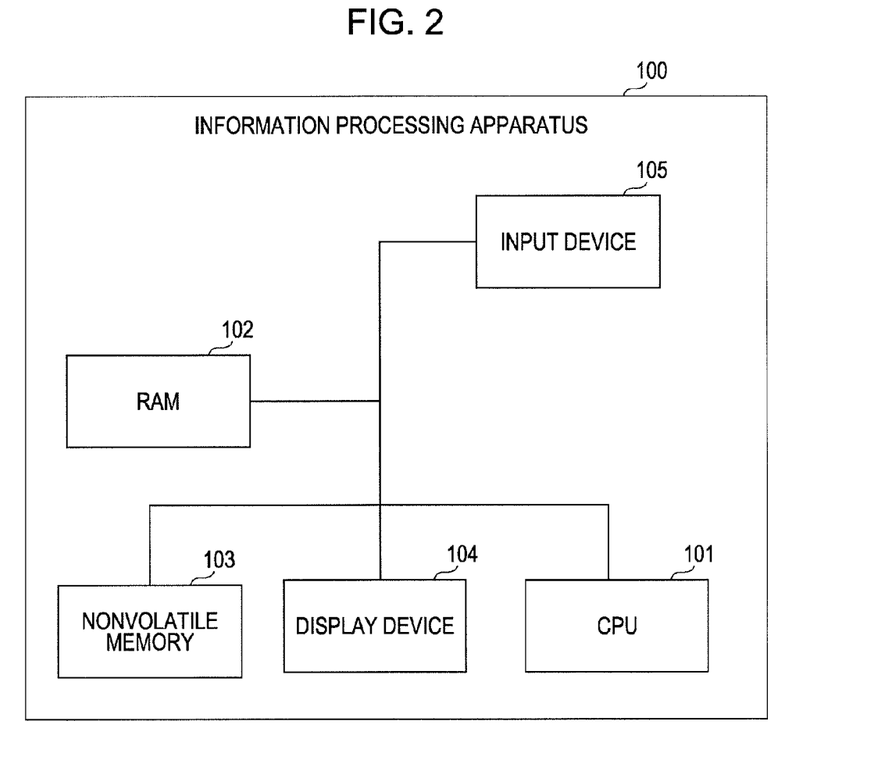
FIG. 2 is a block diagram showing the hardware configuration of an information processing apparatus according to the embodiment.

The purpose of this embodiment has been described above. Next, the hardware configuration of the information processing apparatus 100 according to this embodiment is described with reference to FIG. 2. FIG. 2 is a block diagram showing the hardware configuration of the information processing apparatus 100.

The information processing apparatus 100 includes a central processing unit (CPU) 101, a random access memory (RAM) 102, a nonvolatile memory 103, a display device 104, and an input device 105.

The CPU 101 functions as an arithmetic processing unit and a control unit to control operations in general in the information processing apparatus 100 according to various programs. The CPU 101 may be a microprocessor. The RAM 102 primarily stores a program used in an execution by the CPU 101, a parameter that changes in correspondence with the execution, or the like. The nonvolatile memory 103 stores a program, an arithmetic parameter, or the like used by the CPU 101. These are mutually connected by a host bus (not shown) configured of a CPU bus or the like.

The display device 104 is one example of an output device included in the information processing apparatus 100. The display device 104 is configured of, for example, a liquid crystal display (referred below to as LCD) device and outputs a result obtained by various processing performed by the information processing apparatus 100. Specifically, the display device 104 displays the result obtained by the various processing performed by the information processing apparatus 100 as a text or an image.

The input device 105 includes an input mechanism such as, for example, a mouse, a keyboard, a touchscreen, a button, a microphone, a switch, or a lever for the user to input information and an input control circuit that generates an input signal based on an input by the user and outputs the input signal to the CPU 101. The user of the information processing apparatus 100 can input various data or give command for processing operation with respect to the information processing apparatus 100 by operating the input device 105.

In this embodiment, an operation by the user is accepted mainly by detecting an operating body, such as a finger or a hand of the user, using the touch panel. The touch panel provides two functions: display and input. The touch panel according to this embodiment detects whether the finger or hand of the user is in proximity or in contact. When proximity is detected, a region of the proximity is detected. A detection method may involve a resistive system utilizing a metal thin film forming a transparent electrode, a capacitive system in which a change in capacitance between a fingertip and a conductive layer is acquired to detect a position, an infrared ray shielding system, an electromagnetic induction system, or the like, as long as the method enables detection of position information of the operating body with respect to the display.

Herein, a case where the operating body is detected using a capacitive touch panel is specifically described. The capacitive touch panel includes capacitive sensors arranged in a grid pattern. A value of the capacitive sensor changes constantly depending on the change in the capacitance. When the finger as the operating body approaches or contacts the capacitive sensor, the capacitance detected by the capacitive sensor increases. The respective capacitive sensors are capable of acquiring the capacitances simultaneously. It is possible to detect the shape of the finger in proximity or in contact by simultaneous detection of changes in the capacitances in all of the capacitive sensors and interpolation. The capacitive touch panel outputs the value of the detected capacitance to the CPU 101.

Figure 3:
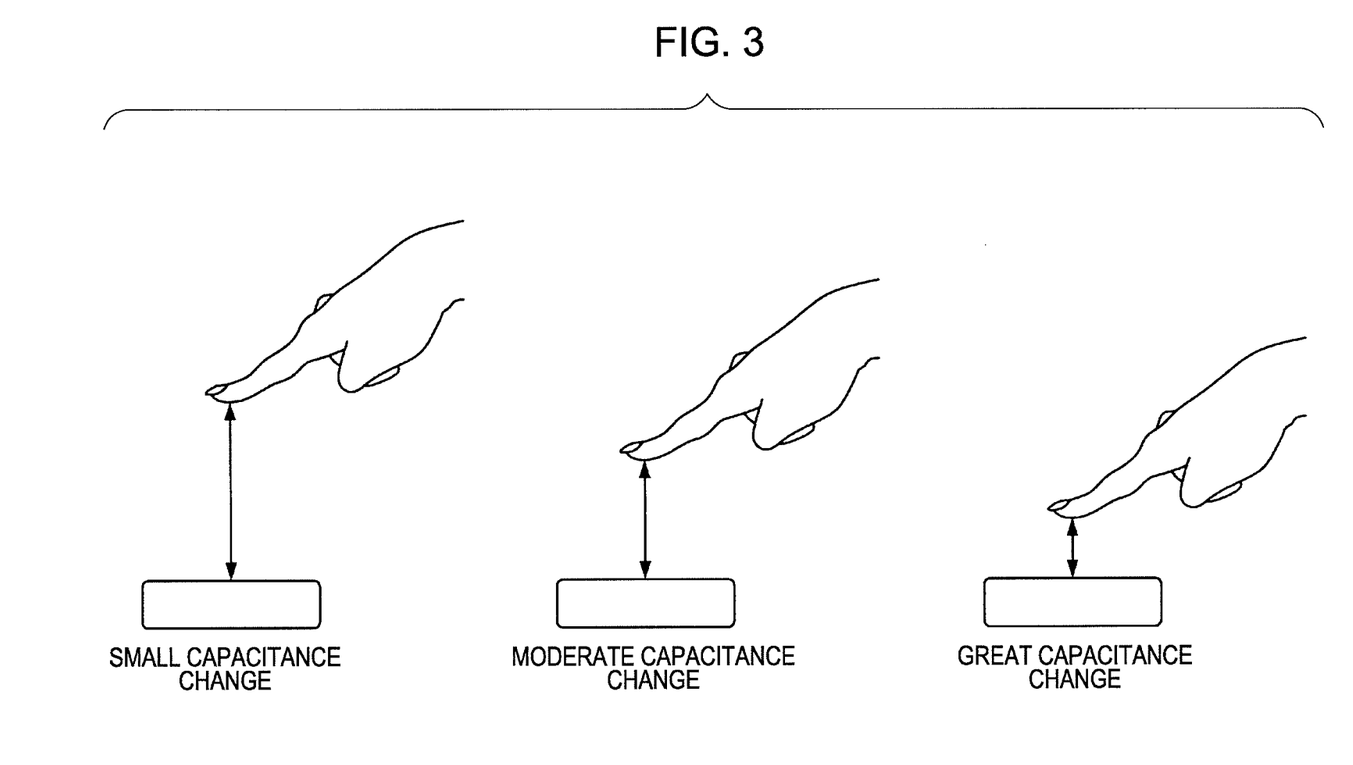
FIG. 3 illustrates a proximity operation and a proximity region of an operating body according to the embodiment.
Figure 4:
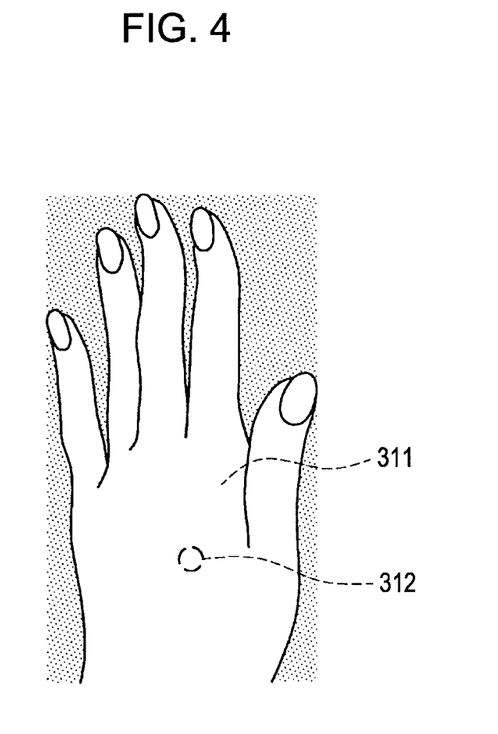
FIG. 4 illustrates the proximity operation and the proximity region of the operating body according to the embodiment.

Next, a proximity operation and a proximity region of the operating body according to this embodiment are described with reference to FIGS. 3 and 4. FIGS. 3 and 4 illustrate the proximity operation and the proximity region of the operating body. In this embodiment, the proximity operation refers to an operation of the operating body when the operating body approaches the touch panel and the change in the capacitance of the touch panel is within a predetermined value range. Assume that the capacitance has changed from small to moderate to great, as shown in FIG. 3. When the change in the capacitance is smaller than a predetermined threshold value (the change in the capacitance is small), the operating body is identified as being neither in proximity nor in contact. When the change in the capacitance is greater than a predetermined threshold value (the change in the capacitance is great), the operating body is identified as being in contact. When the change in the capacitance is within the predetermined value range (the change in the capacitance is moderate), the operating body is identified as being in proximity.

Also, as shown in FIG. 4, a proximity detection region 311 refers to a region in which the change in the capacitance of the touch panel is greater than a predetermined value when the operating body is in proximity. The proximity detection region 311 is also referred to below as the proximity area. A center-of-gravity point 312 of the proximity area 311 is calculated to detect the movement of the center-of-gravity point 312 as the movement of the operating body at the time of the proximity operation. By detecting the movement of the center-of-gravity point 312 of the proximity area 311 as the movement of the operating body in this manner, it is possible to detect a movement direction or a movement amount (movement distance) of the operating body at the time of the proximity operation.

The hardware configuration of the information processing apparatus 100 according to this embodiment has been described above. Each of the components described above may be configured using a general-purpose member or may be configured of hardware specialized for the function of the component. Thus, it is possible to change the hardware configuration to be utilized, as appropriate, according to the technical level at the time of carrying out each embodiment.

[3] Functional Configuration of Information Processing Apparatus

Figure 5:
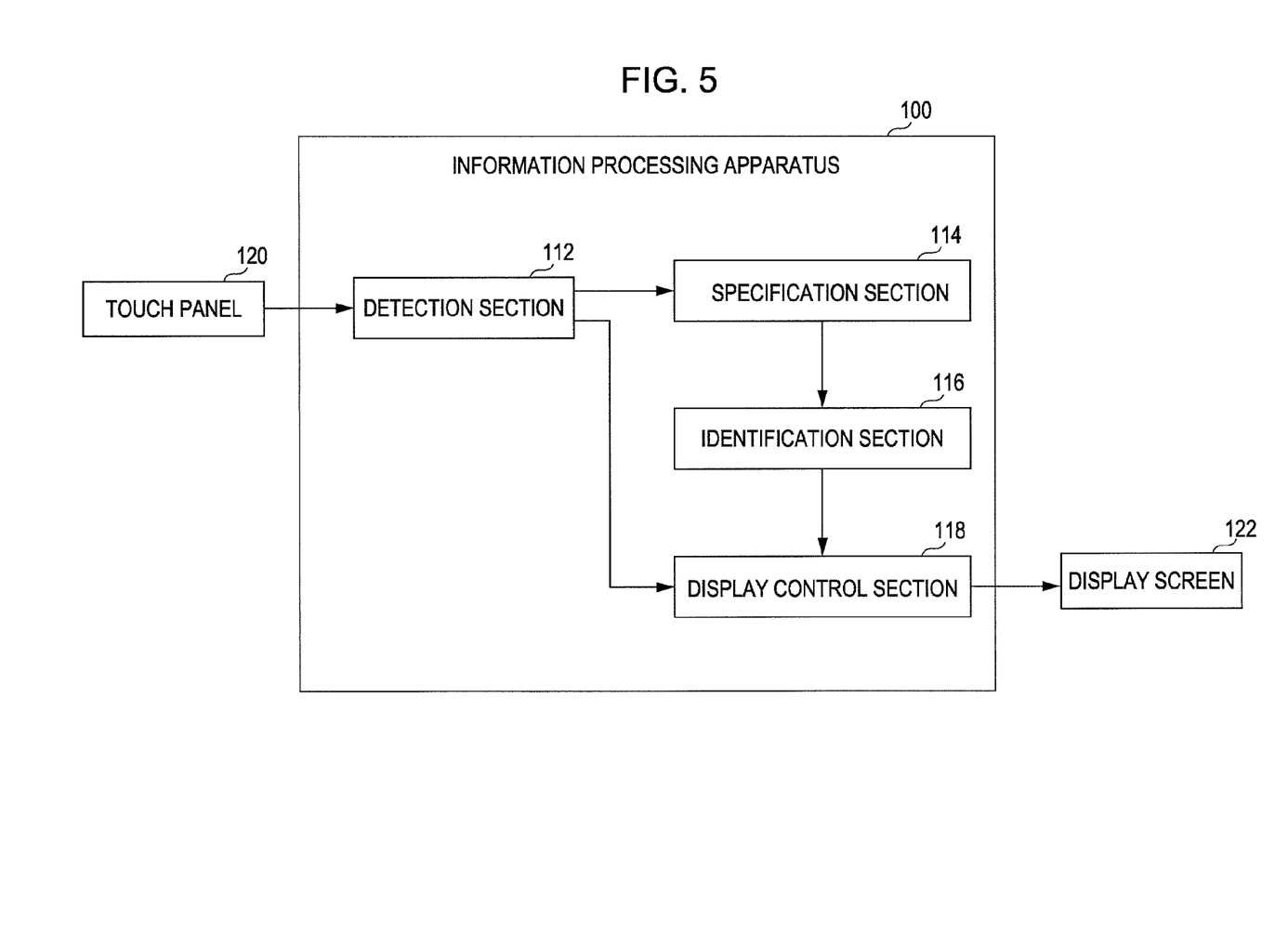
FIG. 5 is a block diagram showing the functional configuration of the information processing apparatus according to the embodiment.

Next, the functional configuration of the information processing apparatus 100 according to this embodiment is described with reference to FIG. 5. With FIG. 5, control in the CPU 101 is described in particular. Note that the functional configuration of the information processing apparatus 100 shown in FIG. 5 is described with reference to FIGS. 6 to 10, as appropriate. FIG. 5 is a block diagram showing the functional configuration of the information processing apparatus 100 according to this embodiment. Note that a display screen 122 is one example of the display device 104 described above, and a touch panel 120 is one example of the input device 105 described above.

As shown in FIG. 5, the information processing apparatus 100 includes a detection section 112, a specification section 114, an identification section 116, and a display control section 118. The detection section 112 has a function of detecting the proximity area of the operating body. As described above, the capacitance detected by the touch panel 120 increases when the operating body approaches the display screen. The detection section 112 detects that the operating body is in proximity to the display screen when the capacitance detected by the touch panel 120 is within a predetermined range. The detection section 112 notifies the specification section 114 that the operating body is in proximity.

The specification section 114 has a function of specifying a range of the display screen where the operating body is in proximity when the proximity of the operating body is notified by the detection section 112. Since the change in the capacitance is detected by the touch panel 120 as described above, the specification section 114 specifies a range in which the capacitance has changed. The specification section 114 provides the identification section 116 with the range of the display screen where the operating body is in proximity.

The identification section 116 has a function of identifying whether the operating body in proximity to the display screen is in proximity to a selection item included in the display screen. Specifically, whether the range where the specification section 114 has specified as the operating body being in proximity includes the selection item included in the display screen is identified. The identification section 116 provides the display control section 118 with an identification result of whether the range where the operating body is in proximity includes the selection item.

When the identification section 116 identifies the operating body as being in proximity to the selection item of the display screen, the display control section 118 temporarily superimposes and displays a region including selection item content of the selection item over a previously displayed display region. The display control section 118 has a function of ending the display of the region including the selection item content of the selection item when the proximity of the operating body to the display screen is no longer detected by the detection section 112.

In the display example 301, the operating body is in proximity to the display screen and is approaching a selection item 302 in an upper part of an on-screen keyboard, as shown in FIG. 1. At this time, the detection section 112 detects the proximity of the operating body to the display screen, and the specification section 114 further specifies the range of the display screen where the operating body is in proximity. In FIG. 1, the specification section 114 specifies a range including the selection item 302.

Then, the identification section 116 identifies whether the range specified by the specification section 114 includes the selection item. Since the range specified by the specification section 114 includes the selection item 302 in FIG. 1, the display control section 118 temporarily superimposes and displays a region including selection item content of the selection item 302 over the previously displayed display region. A display example 303 shows an example in which a region including selection item content 304 of the selection item 302 is displayed in the display screen.

Then, when the proximity of the operating body to the display screen is no longer detected, i.e., when the operating body has withdrawn from the display screen, the display returns from the display example 303 showing the region including the selection item content to the previous display of the display example 301. In this embodiment, it is possible in this manner to detect the range where the operating body is in proximity and temporarily display the region including the selection item content included in the range. Then, when the proximity of the operating body is no longer detected, the previous display is immediately restored.

Since the user can check the selection item content through intuitive operation of bringing the operating body closer to or farther from the display screen without an operation dedicated to displaying the selection item content, the operability of the touch panel can be improved. Also, since a display region is enlarged temporarily without enlarging display content or reducing display content other than the selection item content, it is possible to utilize the screen area effectively.

Also, it may be such that the display of the selection item content is ended to restore the previous display of the on-screen keyboard also when one of the selection items is selected through contact operation from the displayed selection item content. For example, as shown in FIG. 1, when the display screen is divided into two, the on-screen keyboard and a region including the selection item are displayed in a lower part of the display screen and content selected in the lower part of the display screen is displayed in an upper part of the display screen. In this case, the display region including the selection item content is superimposed and displayed over a display region of the on-screen keyboard in the lower part of the display screen. When one of the selection items is selected from the selection item content, display content relating to the selected selection item is displayed in the upper part of the display screen.

In this manner, even after one of the selection items has been selected from the selection item content included in the display region superimposed and displayed, the previous display screen can be restored without pressing a back button or the like. In the description above, the display region is enlarged through superimposition of a display screen. Thus, it is possible to provide an interface equivalent of an enlarged display screen by omitting an operation step of pressing a back button or the like for a smooth screen transition.

Figure 6:
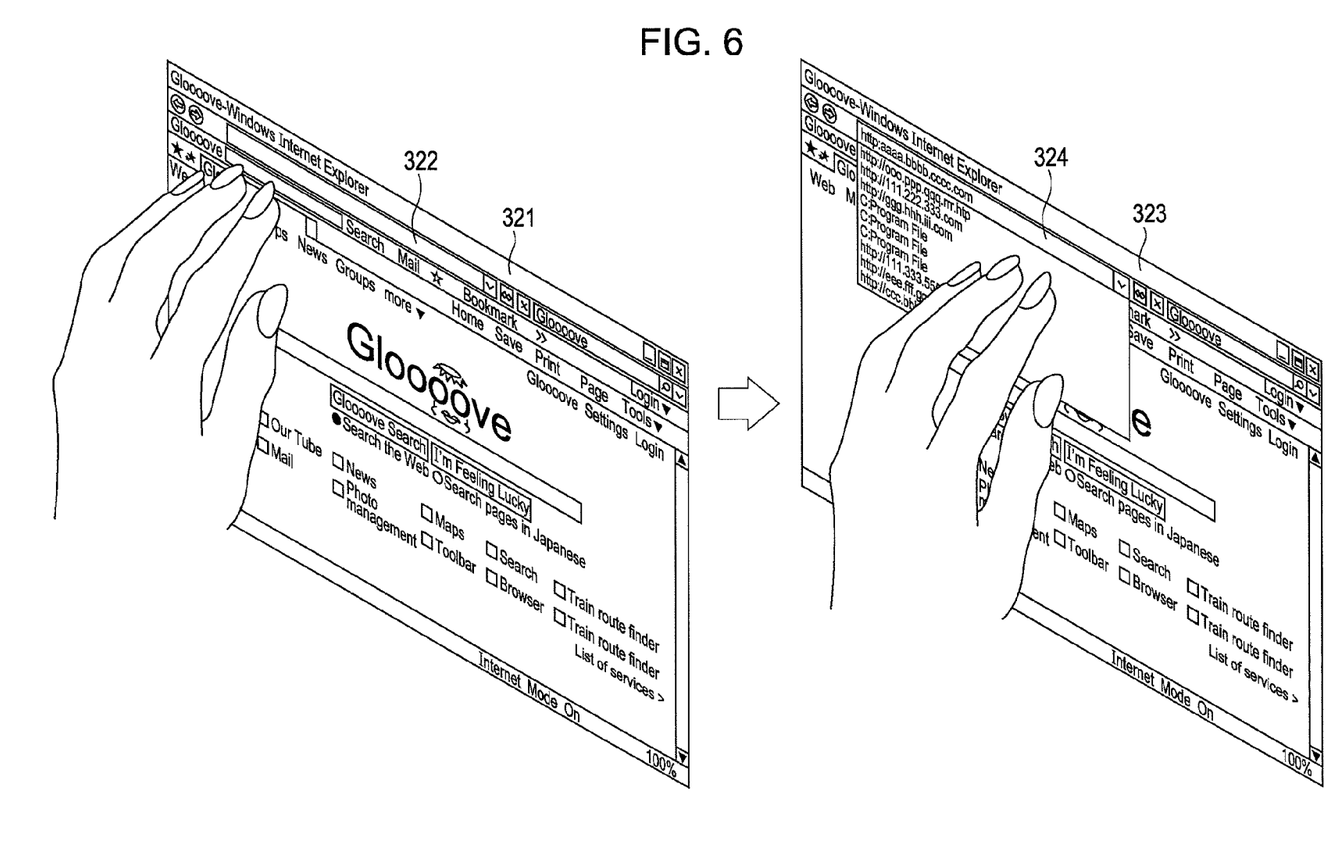
FIG. 6 illustrates a display example according to the embodiment.

Also, as shown in FIG. 6, a region including a pull-down display 324 of selection item content of a selection item 322 may be superimposed and displayed over a previous screen when the operating body is identified as being in proximity to the selection item 322 included in a display screen 321. The pull-down display 324 refers to a display in which a list of the selection item content of the selection item 322 extends downward, as shown in a display screen 323 in FIG. 6. When the operating body is identified as being in proximity, the region including the pull-down display 324 is temporarily displayed. However, once the operating body is identified as no longer in proximity, the region including the pull-down display 324 is no longer displayed. The region including the pull-down display 324 is no longer displayed also when one item of the selection items of the pull-down display 324 is selected through contact operation of the operating body.

Also, as shown in the display screen 323 in FIG. 6, a pull-down display 324 of a list of URLs may be superimposed over a display of a website according to a link selected through user operation. For example, assume that one of the URLs in the pull-down display 324 is selected through the user operation. In this case, the pull-down display 324 is hidden and a page corresponding to the selected URL is displayed in the superimposed display screen 321. In this manner, it is possible to temporarily display the region including the pull-down display 324 merely through proximity of the operating body to the selection item, without the operating body performing a particular operation. Thus, it is possible to provide an interface equivalent of an enlarged display screen by omitting an operation step of pressing a button or the like for a smooth screen transition.

Figure 7:
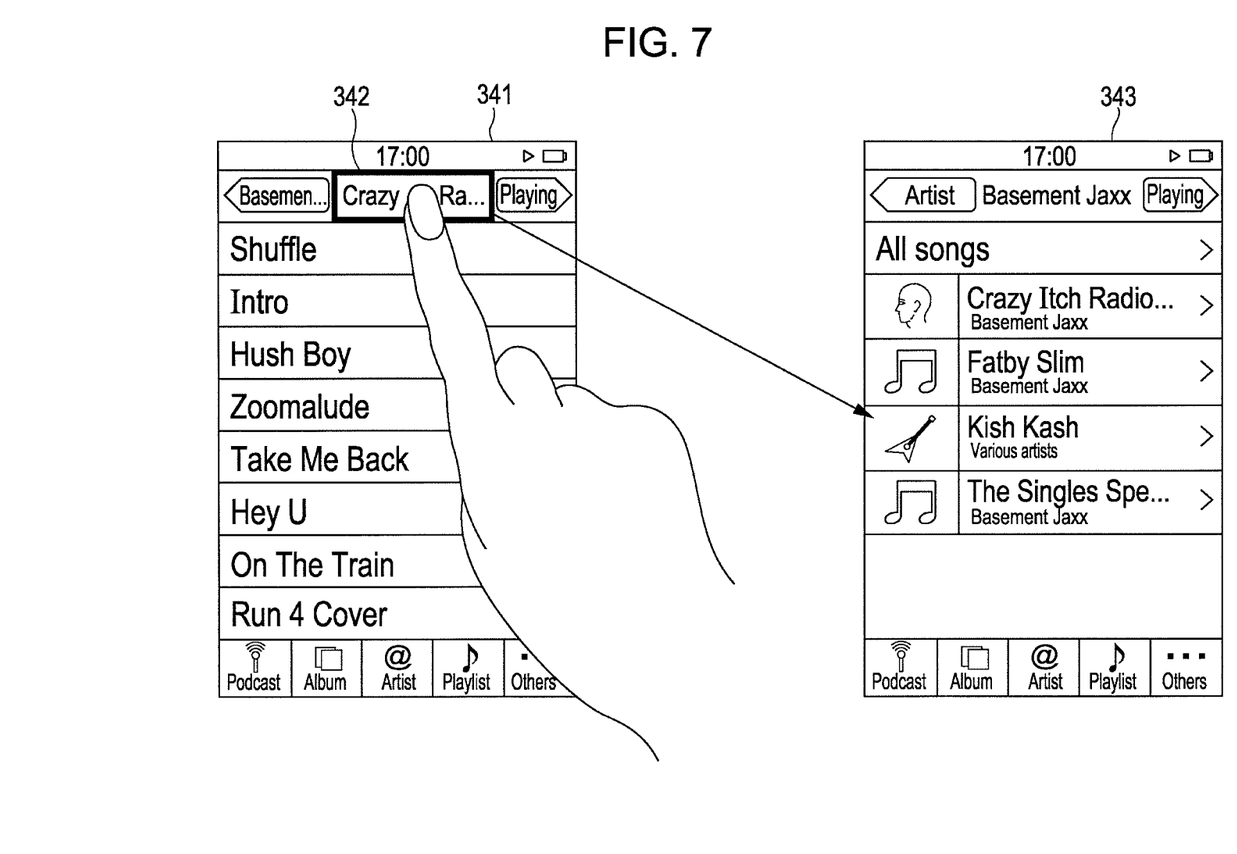
FIG. 7 illustrates a display example according to the embodiment.

Also, as shown in FIG. 7, selection item content of a hierarchical level relating to a selection item 342 may be displayed temporarily when the operating body is identified as being in proximity to the selection item 342 of a display screen 341. For example, assume that a list of tracks included in an album is displayed in the display screen 341 and a name of an artist is displayed in the selection item 342. When the operating body is in proximity to the selection item 342 in which the name of the artist is displayed, a display screen 343 of a list of songs of the artist is temporarily displayed. Although the display screen 343 is temporarily displayed while the operating body is in proximity to the display screen, the display of the display screen 343 is immediately ended to restore the previous display of the display screen 341 when the operating body is no longer in proximity to the display screen. Also, the display of the display screen 343 may be ended also when one of the tracks is selected through contact operation of the operating body while the display screen 343 is temporarily displayed.

In this manner, it is possible to temporarily display another hierarchical level merely through proximity of the operating body to the selection item, without the operating body performing a particular operation. That is, it is possible to provide an interface equivalent of an enlarged display screen by omitting a step of selecting an item through contact operation for a smooth screen transition.

Also, a region including an enlarged display of the selection item content of the selection item may be displayed temporarily when the operating body is identified as being in proximity to the selection item in the display screen. Further, a region including a conversion candidate of the selection item may be displayed temporarily when the operating body is identified as being in proximity to the selection item in the display screen. In this manner, it is possible to effectively utilize the limited screen area to provide the user with increased information by temporarily enlarging the display region of the display screen merely through proximity of the operating body to the display screen.

[4] Operation of Information Processing Apparatus in Detail

Figure 8:
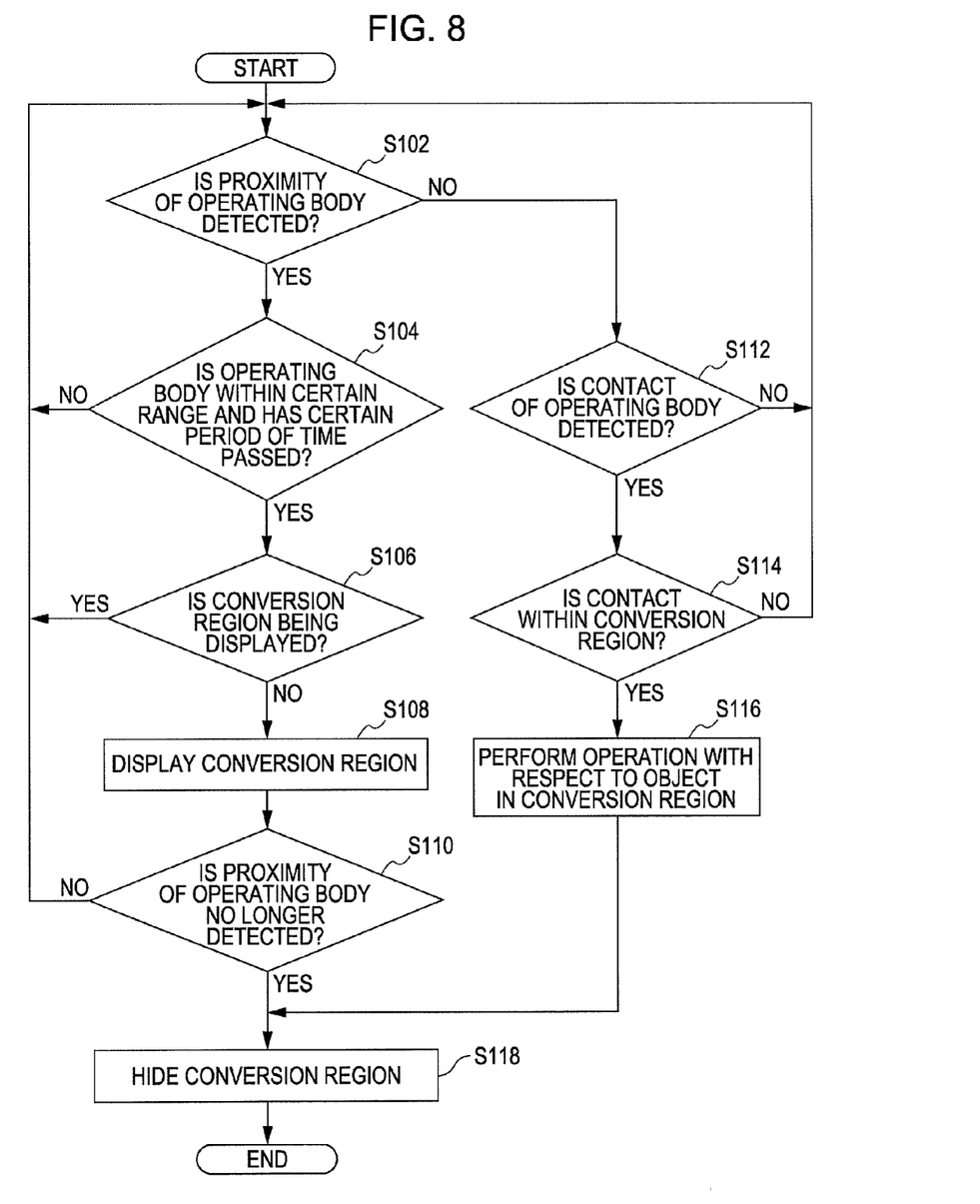
FIG. 8 is a flowchart showing in detail an operation of the information processing apparatus according to the embodiment.

The functional configuration of the information processing apparatus 100 has been described above. Next, an operation of the information processing apparatus 100 is described in detail with reference to FIG. 8. FIG. 8 is a flowchart showing in detail the operation of the information processing apparatus 100. As shown in FIG. 8, the detection section 112 first detects whether the operating body is in proximity to the display screen (S102). In step S102, whether the operating body is in proximity to the display screen is detected by determining whether the change in the capacitance detected by the touch panel is greater than or equal to a certain range.

Then, in step S104, whether the operating body is within a certain range from the display screen and a certain period of time has passed is determined (S104). When the operating body is determined as being in proximity to the display screen in step S102, the specification section 114 determines whether the operating body stays within the certain range for the certain period of time. When the proximity of the operating body is not detected in step S102, processes from step S112 onwards are executed. The processes of step S112 onwards are described later in detail.

When it is determined that the operating body has stayed within the certain range for the certain period of time in step S104, whether a conversion region is being displayed is determined (S106). The conversion region being displayed in step S106 means that a region including the selection item content described above is being displayed. The region including the selection item content is referred to below as the conversion region. When it is determined that the operating body has not stayed within the certain range for the certain period of time in step S104, process returns to step S102.

When it is determined that the conversion region is not being displayed in the display screen in step S106, the selection item content (conversion region) of the selection item included in the range where the operating body is in proximity is temporarily displayed (S108). When it is determined that the conversion region is being displayed in the display screen in step S106, the process returns to step S102.

Then, after the conversion region has been displayed temporarily in step S108, whether the proximity of the operating body is no longer detected is determined (S110). When it is determined that the proximity of the operating body is no longer detected in step S110, the conversion region which has been displayed temporarily in the display screen is hidden (S118). When the proximity of the operating body is detected in step S110, the process returns to step S102.

When step S102 is repeated and the proximity of the operating body is not detected, whether contact of the operating body is detected is determined (S112). Then, whether a region of the display screen where the operating body is in contact is within the conversion region is determined (S114). When the contact of the operating body is not detected in step S112, the process returns to step S102.

When the region of the display screen where the operating body is in contact is determined to be within the conversion region in step S114, an operation with respect to an object in the conversion region is recognized and executed (S116). When the region of the display screen where the operating body is in contact is determined to be not within the conversion region in step S114, the process returns to step S102.

An example of the operation with respect to the object in the conversion region in step S116 is an operation of selecting one of the selection items displayed in the conversion region through contact operation. After the operation with respect to the object in the conversion region has been executed in step S116, the displayed conversion region is hidden (S118).

As described above, in this embodiment, the conversion region is hidden when the proximity operation of the operating body is no longer detected or the contact operation with respect to the object in the conversion region is performed after the conversion region has temporarily been displayed according to the proximity operation of the operating body. In this manner, it is possible to provide an interface equivalent of an enlarged display screen by omitting an operation step of pressing a button or the like and temporarily displaying a display region which does not fit in the display screen merely through proximity of the operating body to the display screen.

Although the preferred embodiment of the present invention has been described above in detail with reference to the accompanying drawings, the present invention is not limited to the example. It is clear to those skilled in the art to which the present invention pertains that various modifications or alterations are conceivable within the scope of the technical idea according to the embodiment of the present invention, and it should be understood that they are also naturally within the technical scope of the present invention.

For example, the respective steps in the processing of the information processing apparatus 100 in this specification may or may not be performed chronologically in the order stated in the flowchart. That is, the respective steps in the processing of the information processing apparatus 100 may be different processes or executed in parallel.

Also, it is possible to create a computer program for causing hardware such as the CPU, the ROM, or the RAM built in the information processing apparatus 100 to fulfill a function equivalent to that of each component of the information processing apparatus 100 described above. Also, a storage medium storing the computer program may be provided.

The present application contains subject matter related to that disclosed in Japanese Priority Patent Application JP 2009-295584 filed in the Japan Patent Office on Dec. 25, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    a detection section configured to detect an operating body in proximity to a display screen;
    a specification section configured to specify a range of the display screen where the operating body detected by the detection section is in proximity;
    an identification section configured to identify whether the operating body detected by the detection section is in proximity to a selection item included in the display screen; and
    a display control section configured to temporarily superimpose and display a region including selection item content of the selection item over a previously displayed display region when the identification section identifies the operating body as being in proximity to the selection item and configured to end a display of the region including the selection item content of the selection item when the detection section no longer detects the operating body as being in proximity to the display screen, wherein the identification section identifies whether the range specified by the specification section includes the selection item, wherein the specification section specifies the range of the display screen by designating, as the range, all areas of the display screen where one or more portions of the operating body are within a proximity distance from the display screen, and wherein each one of the detection section, the specification section, the identification section, and the display control section is implemented via at least one processor.

2. The information processing apparatus according to claim 1, wherein the display control section ends the display of the region including the selection item content of the selection item when the detection section detects the operating body as being in contact with the display screen.

3. The information processing apparatus according to claim 1, wherein the display control section displays a region including an enlarged display of the selection item content of the selection item when the identification section identifies the operating body as being in proximity to the selection item.

4. The information processing apparatus according to claim 1, wherein the display control section displays a region including a pull-down display of the selection item content of the selection item when the identification section identifies the operating body as being in proximity to the selection item.

5. The information processing apparatus according to claim 1, wherein the display control section displays a region including conversion content of the selection item when the identification section identifies the operating body as being in proximity to the selection item.

6. The information processing apparatus according to claim 1, wherein the display control section displays a region including content of a parent or child of the selection item when the identification section identifies the operating body as being in proximity to the selection item.

7. The information processing apparatus according to claim 1, wherein the identification section identifies that the detected operating body is in proximity to the selection item when the selection item is determined to be displayed within the specified range of the display screen.

8. The information processing apparatus according to claim 1, wherein the identification section identifies that the detected operating body is in proximity to the selection item when the selection item is determined to be displayed within the area of the display screen where the portions of the operating body are within the proximity distance from the display screen.

9. The information processing apparatus according to claim 8, wherein the display control section temporarily superimposes and displays the region including the selection item content of the selection item by superimposing and displaying the region including the selection item content of the selection item over an area of the display screen where an on-screen keyboard was previously displayed as the previously displayed display region.

10. The information processing apparatus according to claim 1, wherein the display control section temporarily superimposes and displays the region including the selection item content of the selection item by superimposing and displaying the region including the selection item content of the selection item over an area of the display screen where an on-screen keyboard was previously displayed as the previously displayed display region.

11. An information processing method comprising the steps of:

detecting an operating body in proximity to a display screen;

specifying a range of the display screen where the detected operating body is in proximity;

identifying whether the detected operating body is in proximity to a selection item included in the display screen;

identifying whether the specified range includes the selection item; and superimposing and displaying selection item content of the selection item over a previously displayed display region when the operating body is identified as being in proximity to the selection item, wherein the range of the display screen is specified by designating, as the range, all areas of the display screen where one or more portions of the operating body are within a proximity distance from the display screen.

12. A non-transitory computer-readable medium having embodied thereon a program, which when executed by the computer causes the computer to perform an information processing method, the method comprising:

detecting an operating body in proximity to a display screen;

specifying a range of the display screen where the detected operating body is in proximity;

identifying whether the detected operating body is in proximity to a selection item included in the display screen;

identifying whether the specified range includes the selection item; and superimposing and displaying selection item content of the selection item over a previously displayed display region when the operating body is identified as being in proximity to the selection item, wherein the range of the display screen is specified by designating, as the range, all areas of the display screen where one or more portions of the operating body are within a proximity distance from the display screen.

* * * * *